July 22, 1952   A. V. CARRIKER   2,604,227
COOKING UTENSIL
Filed Aug. 22, 1947

INVENTOR.
Arthur V. Carriker
BY
ATTORNEYS.

Patented July 22, 1952

2,604,227

UNITED STATES PATENT OFFICE 2,604,227

COOKING UTENSIL

Arthur V. Carriker, Independence, Mo.

Application August 22, 1947, Serial No. 770,000

1 Claim. (Cl. 220—63)

This invention related to the field of containers, particularly to cooking utensils and the method of manufacturing the same, the primary object being to provide a cooking utensil adapted to evenly distribute the heat to the foods being prepared and at the same time, maintain sanitation.

The most important object of this invention is the provision of a cooking utensil having an innermost lining formed from one kind of metal and a shell of another metal tightly surrounding the sides and bottom of the lining, the said lining extending outwardly in overlapped relationship to the uppermost edge of the shell and being rebent upon itself to present a covering flange, the free edge whereof is embedded into the aforesaid shell.

Another important object of this invention is the provision of a cooking utensil having a flat outwardly extending continuous shoulder for receiving the cover for the utensil whereby to present a liquid seal between the cover and the container itself.

A further object of this invention is to provide an inexpensive and effective method of manufacturing a cooking utensil of the aforesaid character which includes the use of stainless steel or analogous substance for an innermost lining and a circumscribing shell formed from aluminum, the latter being applied to the formed stainless steel lining in a molten state, while the lining is maintained slightly heated, whereby the like coefficients of the two metals will cause a tight shrinkage of the aluminum upon the lining as the two metals are simultaneously cooled.

Another object of this invention is to provide a method of manufacturing a cooking utensil which includes the steps of forming an inner lining of stainless steel into the shape desired and heating the same to approximately 500° F. and then pouring molten aluminum around the lining through use of a suitable form while maintaining the lining in said heated condition and finally cooling the two metals simultaneously, whereby the aluminum will shrink tightly upon the stainless steel lining.

Other objects of this invention will be made clear or become apparent during the course of the following specification, reference being had to the accompanying drawing, wherein.

Figure 1:
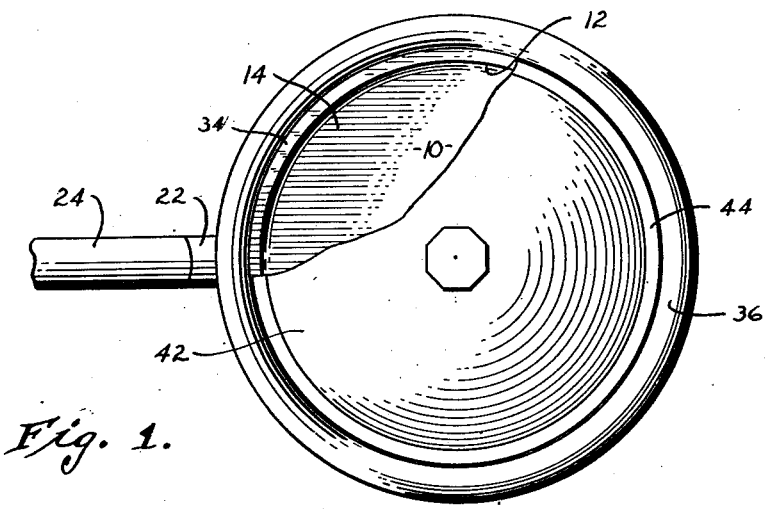
Fig. 1 is a fragmentary top plan view of a cooking utensil made in accordance with my present invention, parts being broken away for clearness.
Figure 2:
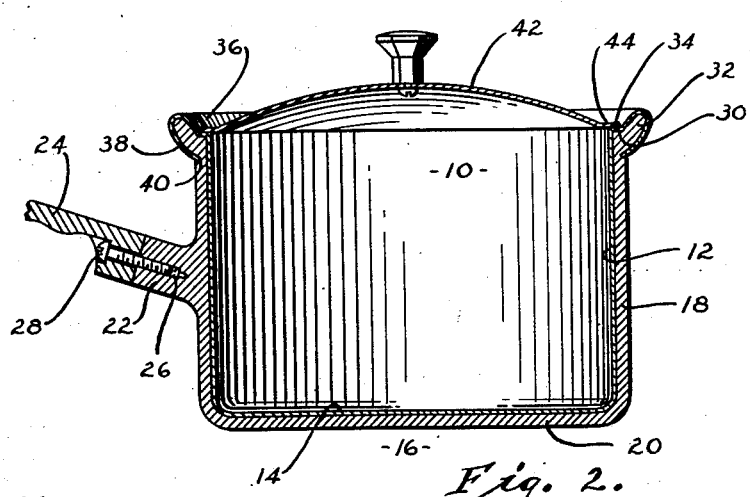
Fig. 2 is a substantially central, vertical cross sectional view taken through the cooking utensil shown in Fig. 1.
Figure 3:
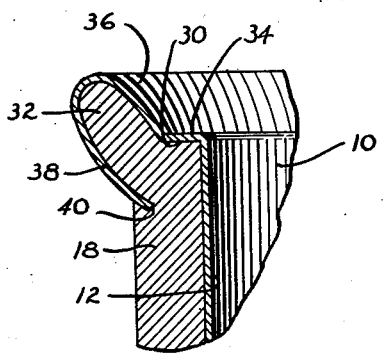
Fig. 3 is an enlarged fragmentary cross-sectional view similar to that illustrated in Fig. 2, more clearly showing the manner of forming a locking seal therefor.

It is well known in the art that many types of metals when used in cooking utensils, have the inherent advantage of storing heat uniformly and thereby being capable of not overheating the foods being prepared by such cooking utensil. Aluminum does have the disadvantage however, of not being entirely free from volatile or soluble constituents which oftentimes impart an odor or taste to the materials being prepared. Stainless steel on the other hand, does not have this disadvantage but is not capable of holding heat as in the case of aluminum.

The cooking utensil about to be described includes the combination of the two above described metals to combine the advantages thereof and to present a cooking container that will not overheat the materials being prepared and at the same time, is extremely sanitary.

In the drawing, the numeral 10 designates broadly an innermost lining formed in any desired shape or style from stainless steel. This lining 10 has an open top and in the instance illustrated, has a circular side wall 12 and a bottom 14. A shell, broadly designated by the numeral 16, tightly surrounds the side wall 10 and bottom 14 of the stainless steel lining 10 having an annular side wall 18 and a bottom 20. If desired, this outermost cover 16 of aluminum may be molded to present an extension 22 for receiving a handle 24. A threaded bore 26 is formed in the extension 22 for receiving a screw or the like 28, for holding the handle 24 tightly upon the extension 22.

The outermost shell 16 extends upwardly and outwardly from the uppermost edge 30 thereof into a continuous annular flange 32. The shell 10 has a continuous out-turned flange portion 34 which overlies the edge 30 of the shell 16 and tightly rests thereupon. This flange 34 of the lining 10 then extends upwardly and outwardly as at 36 in overlying relationship with the flange portion 32 of the shell 16. This portion 36 of the lining 10 is then rebent upon itself as at 38 to completely cover the annular flange portion 32 of the shell 16. The innermost free edge 40 of this portion 38 of the lining 10, terminates in embedded relationship with the wall 18 of the shell 16 immediately below and adjacent to the lowermost edge of the out-turned flange 32 of shell 16.

It is clear, therefore, that the portions 36, 38 and 40 of the shell 16, when formed as above described, presents a positive lock preventing separation of the liner 10 from the shell 16. The uppermost annular edge of the shell 16 and the out-turned flange 34 of the liner 10, combine to present a continuous annular shoulder for receiving a cover 42. The outermost circumference of this cover 42 is substantially the same as the outermost circumference of the flange 30 of liner 10 at the point where the latter merges with the portion 36 of the liner 10.

The cover 42 has a flat end portion 44 throughout its periphery, this portion 44 having a width substantially the same as the width of the flange 34 of the liner 10. It is thus seen that a liquid seal is presented between the portion 44 of the cover 42 and the flange 34 of the liner 10. Since the portion 36 of the liner 10 completely circumscribes the outermost periphery of the portion 44 of cover 42, such liquid as forms at the periphery of the portion 44, will be retained and effectively seal the contents within the liner 10 of the cooking utensil.

Irrespective of the fact that the cooking utensil just described is provided with a locking seal because of the way in which the liner 10 overlaps the uppermost edge of the shell 16, whenever two metals such as stainless steel and aluminum are fitted together as above described, there is a tendency of separation unless specifically manufactured in the manner about to be described.

This method of manufacture consists first of the step of forming the liner 10 by stamping the same into the shape desired from an initially flat piece of stainless steel. The way in which this liner 10 is stamped into the shape shown in the drawing and including the portions 34, 36 and 38 thereof, is well understood by those skilled in the art and forms no part of the present invention. After the liner 10 has been so stamped out into the desired shape, a quantity of aluminum is heated to the molten stage.

As is well known, aluminum must be heated to a temperature of approximately 1300° F. to cause the same to be sufficiently liquid for easy pouring. The liner 10 is then heated to approximately 500° F., it being found preferable to heat the same to at least 450° F. The purpose of heating the liner 10 prior to the next step is to assure an even flow of the molten material around the outermost faces of the liner 10 before the material sets. Thus it may be possible to only slightly heat the liner 10 if the mold used will permit such easy flow of molten material or if other materials are used either for the liner 10 or the shell 16. In some cases such heating might be eliminated altogether. This heated liner 10 is then inverted from the normal position shown in the drawing and placed into a molding pattern. This molding pattern should encircle the wall 12 of the liner 10 in spaced relationship thereto, depending upon the thickness desired for the shell 16, and also cover the bottom 14 of liner 10 and have means at the bottom thereof for presenting a lock adjacent the point of merger between portions 36 and 38 of the liner 10.

The next step is to pour the molten aluminum into the space between the form and the outermost faces of the liner 10 while maintaining the latter at the said heated temperature of approximately 500° F. After this step has been completed, the entire structure, including the stainless steel lining 10 and the shell 16, should be slowly cooled simultaneously. When the aluminum cools from the 1300° temperature and the lining 10 cools from its heated temperature of approximately 500° F. to a point where the entire utensil may be removed from the form, the aluminum will have a greater shrinkage than the stainless steel, thus forming itself in tight shrinking relationship around the stainless steel liner 10.

The aforesaid lock formed by the molten aluminum flowing into the space defined by the portions 36 and 38 of the liner 10, will cooperate with the tight engagement between the aluminum shell 16 and the liner 10 to hold these two metals positively against separation. When the cooking utensil is placed in use, heating of the two metals thus joined together will not cause the same to separate to any appreciable extent because of the like coefficients of expansion af aluminum and stainless steel.

Manifestly many other types of metals have the same advantageous characteristics when used for cooking utensils and there are other metals in addition to stainless steel and aluminum that will tightly lock one upon the other when manufactured in the manner just above described. It is to be understood, therefore, that the metals above described are for illustrative purposes only but believed to be preferable over other materials.

Many changes and modifications, therefore, may be made over the cooking utensil forming the subject matter of this invention as well as the method of manufacture herein set forth, without departing from the spirit thereof or scope of the appended claim.

Having thus described the invention, what is claimed as new and desired to be secured by Letters Patent is:

In a cooking utensil, an innermost, open top liner having side walls, an annular top planar flange, and a bottom; a shell surrounding the side walls and the bottom of said liner and underlying said planer flange; and a flange integral with the shell at the uppermost open top thereof and extending upwardly and outwardly therefrom, the peripheral edge of said planar flange extending upwardly and outwardly thereof and looped over said shell flange, terminating in marginal edges extending into said side walls of the shell from the outer faces thereof and being molded rigidly within said side walls in sealed, embedded relationship thereto with the shell tightly gripping the opposed marginal edges of that part of the container embedded within the shell, said shell tightly contacting all proximal faces of the liner.

ARTHUR V. CARRIKER.

REFERENCES CITED

The following references are of record in the file of this patent:

UNITED STATES PATENTS

| Number | Name | Date |
| --- | --- | --- |
| 561,566 | Cole | June 9, 1896 |
| 1,043,579 | Eldred | Nov. 5, 1912 |
| 1,854,745 | Keltie | Apr. 19, 1932 |
| 2,060,038 | Christman | Nov. 10, 1936 |
| 2,065,293 | Scudder | Dec. 22, 1936 |
| 2,071,602 | Rheem | Feb. 23, 1937 |

FOREIGN PATENTS

| Number | Country | Date |
| --- | --- | --- |
| 337,313 | Great Britain | Oct. 30, 1930 |